US008160877B1

(12) United States Patent
Nucci et al.

(10) Patent No.: US 8,160,877 B1
(45) Date of Patent: Apr. 17, 2012

(54) HIERARCHICAL REAL-TIME SPEAKER RECOGNITION FOR BIOMETRIC VOIP VERIFICATION AND TARGETING

(75) Inventors: Antonio Nucci, San Jose, CA (US); Ram Keralapura, Santa Clara, CA (US)

(73) Assignee: Narus, Inc., Sunnyvale, CA (US)

( * ) Notice: Subject to any disclaimer, the term of this patent is extended or adjusted under 35 U.S.C. 154(b) by 406 days.

(21) Appl. No.: 12/536,784

(22) Filed: Aug. 6, 2009

(51) Int. Cl.
G10L 17/00 (2006.01)

(52) U.S. Cl. .................. 704/246; 704/247; 704/273

(58) Field of Classification Search ............ 704/246–250
See application file for complete search history.

(56) References Cited

U.S. PATENT DOCUMENTS

| | | | | |
|---|---|---|---|---|
| 4,837,831 | A * | 6/1989 | Gillick et al. ................. | 704/245 |
| 5,414,755 | A * | 5/1995 | Bahler et al. ................ | 379/88.02 |
| 5,862,519 | A * | 1/1999 | Sharma et al. ............... | 704/231 |
| 5,895,447 | A * | 4/1999 | Ittycheriah et al. .......... | 704/231 |
| 6,076,055 | A * | 6/2000 | Bossemeyer et al. ........ | 704/250 |
| 6,748,356 | B1 * | 6/2004 | Beigi et al. .................. | 704/246 |
| 7,231,019 | B2 * | 6/2007 | Pascovici .................... | 379/88.02 |
| 7,337,115 | B2 * | 2/2008 | Liu et al. ..................... | 704/246 |
| 7,590,537 | B2 * | 9/2009 | Kim et al. .................... | 704/245 |
| 7,606,707 | B2 * | 10/2009 | Kakino et al. ................ | 704/246 |
| 7,752,043 | B2 * | 7/2010 | Watson ........................ | 704/235 |
| 7,930,179 | B1 * | 4/2011 | Gorin et al. .................. | 704/246 |
| 7,937,269 | B2 * | 5/2011 | Aggarwal et al. ............ | 704/245 |
| 2002/0032567 | A1 * | 3/2002 | Lindholm et al. ............ | 704/246 |
| 2002/0065657 | A1 * | 5/2002 | Reding et al. ................ | 704/246 |
| 2003/0055642 | A1 * | 3/2003 | Harada ......................... | 704/246 |
| 2003/0061040 | A1 * | 3/2003 | Likhachev et al. ........... | 704/250 |
| 2003/0125947 | A1 * | 7/2003 | Yudkowsky .................. | 704/247 |
| 2004/0225498 | A1 * | 11/2004 | Rifkin ........................... | 704/250 |
| 2005/0125223 | A1 * | 6/2005 | Divakaran et al. ............ | 704/223 |
| 2005/0187770 | A1 * | 8/2005 | Kompe et al. ................. | 704/250 |
| 2006/0074657 | A1 * | 4/2006 | Huang .......................... | 704/246 |
| 2008/0010065 | A1 * | 1/2008 | Bratt et al. .................... | 704/246 |

(Continued)

OTHER PUBLICATIONS

D. Reynolds and R. Rose. "Robust text-independent speaker identification using gaussian mixture speaker models". IEEE/ACM Transactions on Speech and Audio Processing, 1995.
F. Kaiser, P. Maragos and T.F. Quatieri. "On Amplitude and Frequency Demodulation using Energy Operators". IEEE/ACM Transactions on Signal Processing, 1993.
P. Tsiakoulis and A. Potamianos. "Statistical Analysis of Amplitude Modulation in Speech Signals using AM-FM Model". IEEE ICASSP, 2009.
C. Espy-Wilson. "A Phonetically based Semivowel Recognition System", IEEE ICASSP, 1986.

*Primary Examiner* — Douglas Godbold
(74) *Attorney, Agent, or Firm* — Fernandez & Associates, LLP

(57) ABSTRACT

A method for real-time speaker recognition including obtaining speech data of a speaker, extracting, using a processor of a computer, a coarse feature of the speaker from the speech data, identifying the speaker as belonging to a pre-determined speaker cluster based on the coarse feature of the speaker, extracting, using the processor of the computer, a plurality of Mel-Frequency Cepstral Coefficients (MFCC) and a plurality of Gaussian Mixture Model (GMM) components from the speech data, determining a biometric signature of the speaker based on the plurality of MFCC and the plurality of GMM components, and determining in real time, using the processor of the computer, an identity of the speaker by comparing the biometric signature of the speaker to one of a plurality of biometric signature libraries associated with the pre-determined speaker cluster.

22 Claims, 6 Drawing Sheets

U.S. PATENT DOCUMENTS

| | | | |
|---|---|---|---|
| 2008/0059176 A1* | 3/2008 | Ravi et al. | 704/250 |
| 2008/0154597 A1* | 6/2008 | Kawahara et al. | 704/246 |
| 2008/0167871 A1* | 7/2008 | Kim et al. | 704/246 |
| 2008/0215324 A1* | 9/2008 | Hirohata | 704/246 |
| 2009/0119103 A1* | 5/2009 | Gerl et al. | 704/243 |
| 2009/0248412 A1* | 10/2009 | Washio | 704/246 |
| 2009/0326942 A1* | 12/2009 | Fulop | 704/246 |
| 2010/0114572 A1* | 5/2010 | Tani et al. | 704/247 |
| 2010/0138223 A1* | 6/2010 | Koshinaka | 704/245 |
| 2010/0185444 A1* | 7/2010 | Olsen | 704/246 |

* cited by examiner

HIERARCHICAL REAL-TIME SPEAKER RECOGNITION FOR BIOMETRIC VOIP VERIFICATION AND TARGETING

BACKGROUND OF THE INVENTION

1. Field of the Invention

The present invention relates to computers and computer networks. More particularly, the invention relates to biometric voice over Internet protocol (VoIP) verification and targeting using hierarchical real-time speaker recognition.

2. Background of the Related Art

Government Internet surveillance (or IP surveillance) has been a hot topic of discussion over the past several years. The key issue for the government is to strike a middle ground where the surveillance program focuses only on "potential" suspects, but not on "all" citizens or residents. The complexity of implementing such a solution that satisfies this middle ground is illustrated as the following scenario. The government has identified a potential suspect and a VoIP (Voice over IP) phone number that he/she had used before. Let us assume that the government has a warrant to monitor all activities of this suspect. A typical approach that the government uses today is to monitor all activity of the VoIP phone number (that the suspect had used sometime before) by recording all incoming and outgoing calls. If the VoIP phone is not used by the suspect, but by someone else then the government is spying on a person that they do not have permission to monitor. Given that it is extremely hard to find out in real time whether the person talking on the phone is the suspect or not, the above approach is the best option for the government to accomplish the surveillance task. However, this raises the question of privacy for non-suspects.

In the same scenario above, let us now consider the possibility that the suspect starts using a new VoIP phone number for his/her communication in order to hide his/her identity. Given that the government only targets the old VoIP phone number of the suspect and is unaware of his new phone number, it will not be able to monitor the suspect despite knowing that there is a potential danger from the suspect.

SUMMARY

Speaker recognition uses pattern recognition techniques in the field of bio-metric security. A speaker recognition system takes a piece of utterance as input and gives an estimated identity of the speaker as output. The system has to be trained so that the estimation it gives is not random guess. A speaker recognition system can be divided into three categories: 1) speaker verification, 2) close set speaker identification, 3) open set speaker identification. For a given testing utterance, speaker verification system needs to decide whether it is spoken by the claimed speaker. The close set speaker identification system needs to decide which one of the registered speakers makes (or speaks) the utterance. If the utterance is produced by an unregistered speaker, the system will claim it as the most likely one among the registered speakers. The open set speaker identification system can tell if the utterance is from an unregistered speaker by introducing a reference model for all the unknown speakers. Based on the dependency on the content of the speech, speaker recognition systems may be content dependent or content independent.

To address the Internet surveillance problems described above, we need a highly sophisticated "targeted" IP surveillance program that can monitor: (i) only the activities of "known" suspects and (ii) all activities of "known" suspects. In embodiments of the invention, a method is provided that addresses the "targeted" IP surveillance problem for suspects (referred to as Targets) using VoIP phones. In embodiments of the invention, a real-time speaker recognition system is provided that addresses both of the above issues based on a target's voice sample from an earlier time.

Specifically, the real-time speaker recognition system operates in two modes described below. In the "Speaker Verification" mode, the real-time speaker recognition system intercepts the phone calls for any VoIP phone number of interest. For example, the real-time speaker recognition system monitors the conversation and in real-time (e.g., 3-4 seconds from the start of the conversation) identifies if the speaker using the VoIP phone is the target under surveillance. If the speaker is the target, then the complete voice conversation is recorded for further analysis. In the "Speaker Identification" (or "Speaker Biometric") mode, the real-time speaker recognition system monitors all VoIP conversations that are visible to the system and in real-time (e.g., 3-4 seconds from the start of a conversation) uses the voice sample to determine the identity of the speaker. Assuming that we have N targets and a sample for each of these N targets in a library, then given a new voice sample the real-time speaker recognition system identifies if the voice sample matches one of the N targets registered in the library. If matched, the specific target is identified and the entire conversation of the target is recorded if necessary.

It is one objective of the invention to use the voice of a person as his/her biometric identity that can be scalable to millions of users.

The existing algorithms can only provide verification/identification of speakers with good confidence when the number of registered targets in the library is limited (usually less than 100). It is another objective of the invention to substantially increase such limit, for example recognizing up to 10,000 speakers with superior accuracy. In one or more embodiments of the invention, the real-time speaker recognition system uses hierarchical speaker recognition architecture to accommodate more than a million targets in the library without sacrificing accuracy.

The existing algorithms require a large training sample size, for example a 30-second-long speech for each speaker. It is yet another objective of the invention to reduce such requirement to, for example, 1-second-long speech for each speaker.

The existing algorithms are not able to identify distinctive features for a large number of speakers. It is still another objective of the invention to address this challenging problem, for example based on novel supervised manifold learning algorithms.

Many existing algorithms are not able to identify a speaker if the speaker uses different words than those in the library, or even if the speaker uses a different language during training and classification. It is still another objective of the invention to achieve text-independent/language-independent speaker recognition, for example by using the acoustic features rather than the text features such as the phonemes.

Many existing algorithms fail to recognize a speaker under the conditions of background noise, multiple interfering speakers, different gender, different age, different health condition (e.g., sore throat), etc. It is still another objective of the invention to perform speaker recognition under these unfavorable conditions.

Most of the existing algorithms for speaker recognition have been designed to operate in a pure off-line mode, meaning that the classification phase is not required to be executed in real-time. It is still another objective of the invention to classify a target (in verification and/or identification mode) with low computational complexity thus in real-time.

In general, in one aspect, the invention relates to a method for real-time speaker recognition including obtaining speech data of a speaker, extracting, using a processor of a computer, a coarse feature of the speaker from the speech data, identifying the speaker as belonging to a pre-determined speaker cluster based on the coarse feature of the speaker, extracting, using the processor of the computer, a plurality of Mel-Frequency Cepstral Coefficients (MFCC) and a plurality of Gaussian Mixture Model (GMM) components from the speech data, determining a biometric signature of the speaker based on the plurality of MFCC and the plurality of GMM components, and determining in real time, using the processor of the computer, an identity of the speaker by comparing the biometric signature of the speaker to one of a plurality of biometric signature libraries associated with the pre-determined speaker cluster. Throughout this document, the terms "Cepstral" and "Cepstrum" may be used interchangeably depending on the context.

In general, in one aspect, the invention relates to a computer readable medium embodying instructions when executed by the computer to perform real-time speaker recognition. The instructions include functionality for real-time speaker recognition including obtaining speech data of a speaker, extracting, using a processor of a computer, a coarse feature of the speaker from the speech data, identifying the speaker as belonging to a pre-determined speaker cluster based on the coarse feature of the speaker, extracting, using the processor of the computer, a plurality of Mel-Frequency Cepstral Coefficients (MFCC) and a plurality of Gaussian Mixture Model (GMM) components from the speech data, determining a biometric signature of the speaker based on the plurality of MFCC and the plurality of GMM components, and determining in real time, using the processor of the computer, an identity of the speaker by comparing the biometric signature of the speaker to one of a plurality of biometric signature libraries associated with the pre-determined speaker cluster.

In general, in one aspect, the invention relates to a system for speaker recognition, including a repository storing a plurality of biometric signature libraries, a processor, and memory storing instructions when executed by the processor comprising functionalities for obtaining speech data of a speaker, extracting a coarse feature of the speaker from the speech data, identifying the speaker as belonging to a pre-determined speaker cluster based on the coarse feature of the speaker, extracting a plurality of Mel-Frequency Cepstral Coefficients (MFCC) for a Gaussian Mixture Model (GMM) from the speech data, determining a biometric signature of the speaker based on the plurality of MFCC and the GMM, and determining in real time an identity of the speaker by comparing the biometric signature of the speaker to one of the plurality of biometric signature libraries associated with the pre-determined speaker cluster.

Other aspects and advantages of the invention will be apparent from the following description and the appended claims.

DETAILED DESCRIPTION

Figure 1:
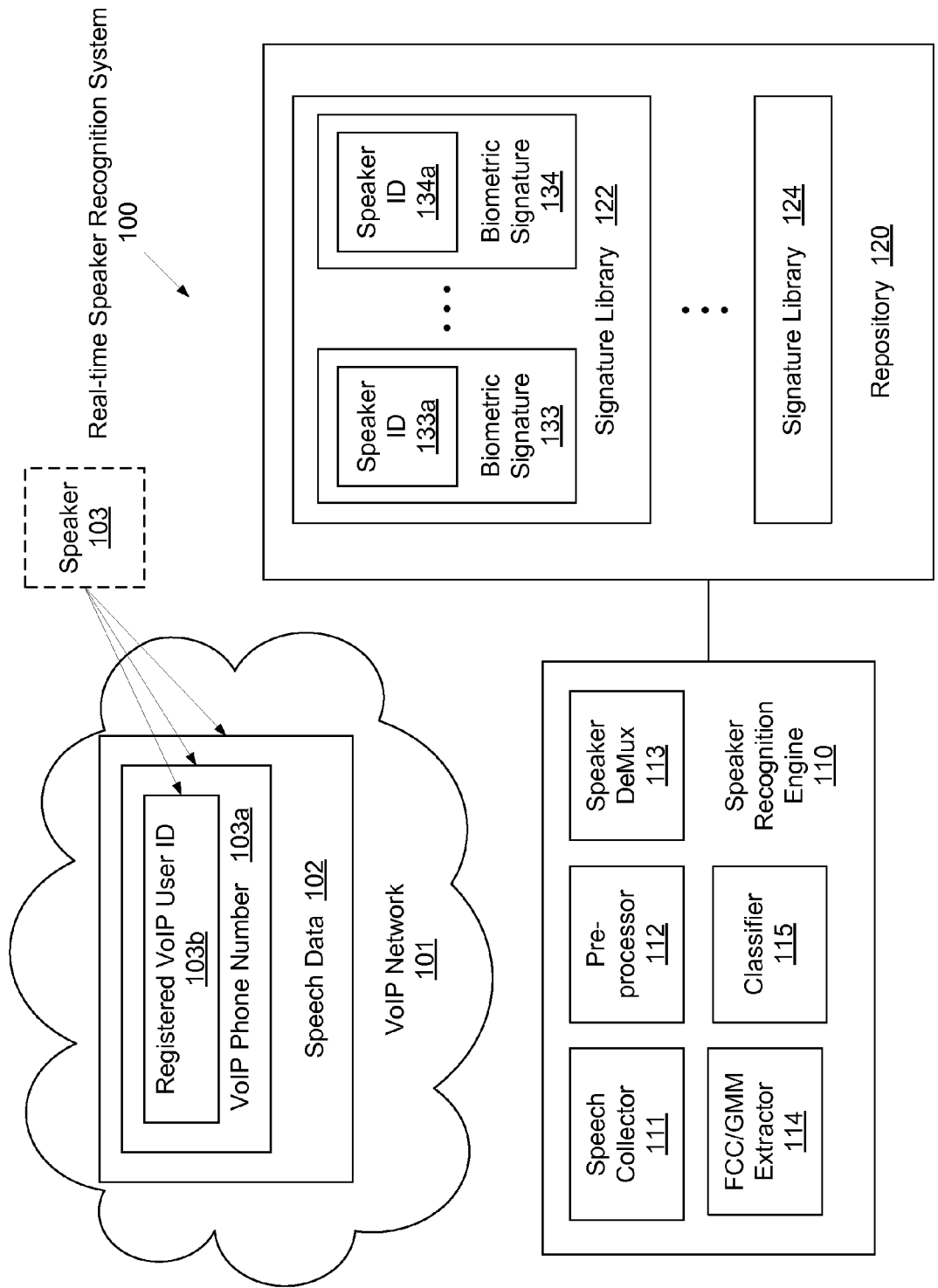
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally speaking, the real-time speaker recognition system may be used for either (i) verifying the identity of a targeted VoIP user or for (ii) targeting a specific VoIP user based on his/her biometric characteristics. The real-time speaker recognition system implements the voice of a person as his/her biometric identity that can be scalable to millions of users. Using such a system we can accurately recognize a person using his/her speech sample. Also, the classification of a user in the real-time speaker recognition system can be accomplished in real-time and hence can be used for real-time verification or identification of targets. Throughout this document, the terms "speaker", "person", "user", and "target" may be used interchangeably based on the context. In addition, the terms "speech", "speech data", "speech sample", "utterance" (i.e., a complete unit of speech in spoken language, generally but not always bounded by silence), and "utterance sample" may be used interchangeably based on the context.

In particular, the real-time speaker recognition system may operate in two stages: the training stage and the classification stage. During the training stage, the real-time speaker recognition system trains a reference model for registered speakers (i.e., VoIP users) of which utterance samples are available in a library. The term "reference model" refers to certain features of a speaker that are captured and analyzed in the speaker recognition process and is described in more details below. In embodiments of the invention, such reference model is used as a biometric signature to identify the speaker and is also referred to as a biometric signature of the speaker. Throughout this document, the terms "reference model", "speaker model", "voice finger print", "signature", and "biometric signature" may be used interchangeably depending on the context.

During the classification stage, the real-time speaker recognition system compares the utterance under test with all the reference models of different speakers stored in the library and makes a decision based on pre-determined thresholds. In one or more embodiments, the real-time speaker recognition system is a closed-set speaker recognition system and decides which of the registered speaker speaks the utterance. If the utterance is produced by an unregistered speaker, the system will output the most likely match among the registered speakers with the associated confidence value. A confidence threshold can then be used as a parameter to label the speaker under test as unregistered (i.e., not currently present in the library). Furthermore, the reference models used by the real-time speaker recognition system are content and language independent such that a decision is made independently of the content or language being used to speak the utterance under test.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

A shown in FIG. 1, the real-time speaker recognition system (100) includes VoIP networks (101), a speaker recognition engine (110), and a repository (120) and is used for identifying a speaker (103) who is using the VoIP network (101). As shown, the VoIP networks (101) includes speech data communication such as speech data (102) (e.g., spoken by the speaker (103)) associated with VoIP phone number (103*a*) that belongs to a user (e.g., the speaker (103) or other user allowing, whether knowingly or unknowingly, the speaker (103) to use the VoIP phone number (103*a*)) identified by registered VoIP user ID (103*b*). Examples of the register VoIP user ID (103*b*) include name, social security number, or other official identifications of a registered user of the VoIP phone number (103*a*).

Further as shown in FIG. 1, the repository (120) include signature libraries (122, 124) while the signature library (122) stores biometric signatures (133, 134) associated with speaker IDs (133*a*, 134*a*). More details of the biometric signatures (133, 134) are described later. In one or more embodiments of the invention, the biometric signatures (133, 134) are obtained from speakers during a training stage using the speaker recognition engine (110). While two signature libraries and two biometric signatures are shown in FIG. 1, any number of signature libraries and/or biometric signatures may be included. In one or more embodiments, each of the signature libraries (122, 124) may be implemented as a database, a file, a linked list, or other suitable data structures.

Furthermore, speaker recognition engine (110) is shown in FIG. 1 to include speech collector (111), pre-processor (112), speaker DeMux (113), FCC/GMM extractor (114), and classifier (115).

In one or more embodiments of the invention, the speaker recognition engine (110) includes the speech collector (111) and is configured to collect speech data (e.g., 102) from the VoIP network (101). For example, the speech collector (111) may include a VoIP traffic sniffer for capturing such speech data.

Generally speaking, the association between the speech data (102) and the VoIP phone number (103*a*) is ascertained by the VoIP traffic sniffer while the association between the VoIP phone number (103*a*) and the registered VoIP user ID (103*b*) is ascertained by the official VoIP phone number user registration records. However, the speaker (103) from whom the speech data (102) is generated may or may not be the registered VoIP user identified by the registered VoIP user ID (103*b*).

In one or more embodiments, VoIP traffic originating from or received by a targeted VoIP phone number (e.g., 103*a*) is captured by the speech collector (111). In such embodiments, a biometric signature is determined from the VoIP traffic (e.g., including the speech data (102)) for verifying whether the speaker (103) of the speech data (102) is indeed the person identified by the registered VoIP user ID (103*a*).

In one or more embodiments, VoIP traffic regardless of any particular VoIP phone number is captured by the speech collector (111). In such embodiments, a biometric signature is determined from the VoIP traffic (e.g., including the speech data (102)) for matching to pre-collected biometric signatures stored in the repository (120) in search of the identification of the speaker (103). If it is determined that no match exists, then the speaker (103) is an unidentified person with an unmatched biometric signature.

In one or more embodiments of the invention, the speaker recognition engine (110) includes the pre-processor (112) and is configured to generate a pre-processed speech signal (not shown) by removing silence frames and oversaturation frames from the speech data (102) as well as normalizing loudness of the speech data (102). More details of the pre-processor (112) operations are described in reference to the example depicted in FIGS. 3A and 3B below.

In one or more embodiments of the invention, the speaker recognition engine (110) includes the speaker DeMux (113) and is configured to extract a coarse feature (not shown) of the speaker (103) from the speech data (102) to identify the speaker (103) as belonging to a pre-determined speaker cluster (not shown) based on the coarse feature of the speaker (103). In one or more embodiments, the coarse feature is used to categorize speakers into general groups referred to as speaker clusters. For example, the coarse feature may include voice pitch to divide speakers into male speaker cluster and female speaker cluster.

In one or more embodiments, the pre-determined speaker cluster may belong to hierarchical speaker clusters arranged in hierarchies such as speaker gender hierarchy (e.g., male speaker, female speaker), speaker native language hierarchy (e.g., native English speaker, native Mandarin speaker, etc.), and speaker age hierarchy (e.g., child speaker, adult speaker, speaker with age 1-15, speaker with age 16-30, etc.), etc.

In one or more embodiments, these hierarchical speaker clusters are arranged in a hierarchical tree structure based on these hierarchies with leaf nodes such as the pre-determined speaker cluster to which the speaker (103) may belong. In one or more embodiments, such pre-determined speaker cluster may be characterized by the properties (referred to as hierarchical properties such as gender, native language, age, etc.) associated with parent nodes in each hierarch of the hierarchical tree structure. For example, the speaker (103) may belong to a speaker cluster of male, native English speaking, age 15-30 speakers. In one or more embodiments, the hierarchical speaker clusters may include more than 500 clusters with various combinations of such hierarchical properties.

In one or more embodiments, each of the hierarchical speaker clusters is associated with a biometric library each including over 1000 biometric signatures. To accomplish such scalability to perform real-time speaker recognition from million plus biometric signatures, the DeMux (113) is configured to categorize the speakers into hundreds of hierarchical speaker clusters based on the process flow described below.

In one or more embodiments, the speaker DeMux (113) is configured to represent the speech data (102) as a sum of amplitude modulation and frequency modulation (AM-FM) models corresponding to a number of formants. Formants are spectral peaks of the sound spectrum of a voice, for example due to resonance of the human vocal tract. It is often measured by a peak in the frequency spectrum of the sound, using a spectrogram or a spectrum analyzer.

In one or more embodiments, the speaker DeMux (113) is configured to extract vowel-like speech frames from the speech data (102) and to determine one or more dominant formant frequencies based on the vowel-like speech frames and the AM-FM models.

In one or more embodiments, the speaker DeMux (113) is configured to generate one or more filtered speech signals by band-passed filtering the vowel-like speech frames based on the one or more dominant formant frequencies.

In one or more embodiments, the speaker DeMux (113) is configured to generate one or more quasi-periodic amplitude envelop signals from the one or more filtered speech signals using discrete energy separation algorithm (DESA).

In one or more embodiments, the speaker DeMux (113) is configured to determine a pitch period of the speaker (103) from the one or more quasi-periodic amplitude envelop signals while the pitch period of the speaker is used as the coarse feature for categorizing the speaker (103) into the hundreds of hierarchical speaker clusters.

More details of the speaker DeMux (113) operations are described in reference to the example depicted in FIGS. 3A and 3B below.

In one or more embodiments of the invention, the speaker recognition engine (110) includes the FCC/GMM extractor (114) and is configured to extract Mel-Frequency Cepstral Coefficients (MFCC) (not shown) for a Gaussian Mixture Model (GMM) (not shown) from the speech data (102). In one or more embodiments, the MFCC for the GMM are extracted from the pre-processed speech signal from the pre-processor (112). In one or more embodiments, the FCC/GMM extractor (114) is further configured to determine a biometric signature (e.g., 133, 134, etc.) of the speaker (103) based on the extracted MFCC and the GMM. In one or more embodiments, the FCC/GMM extractor (114) is further configured to determine such biometric signature with sufficient accuracy and reliability using the speech data (102) with less than 3 seconds in duration. More details of extracting MFCC and GMM as well as determining the biometric signatures are described in an example depicted in FIGS. 3A and 3B below.

In one or more embodiments of the invention, the speaker recognition engine (110) includes the classifier (115) and is configured to determine in real time an identity of the speaker (103) by comparing the biometric signature of the speaker (103) to one biometric library selected from the biometric libraries (122, 124, etc.) that is associated with the aforementioned pre-determined speaker cluster. More details of the classifier (115) operations are described in reference to the example depicted in FIGS. 3A and 3B below.

Figure 2A:
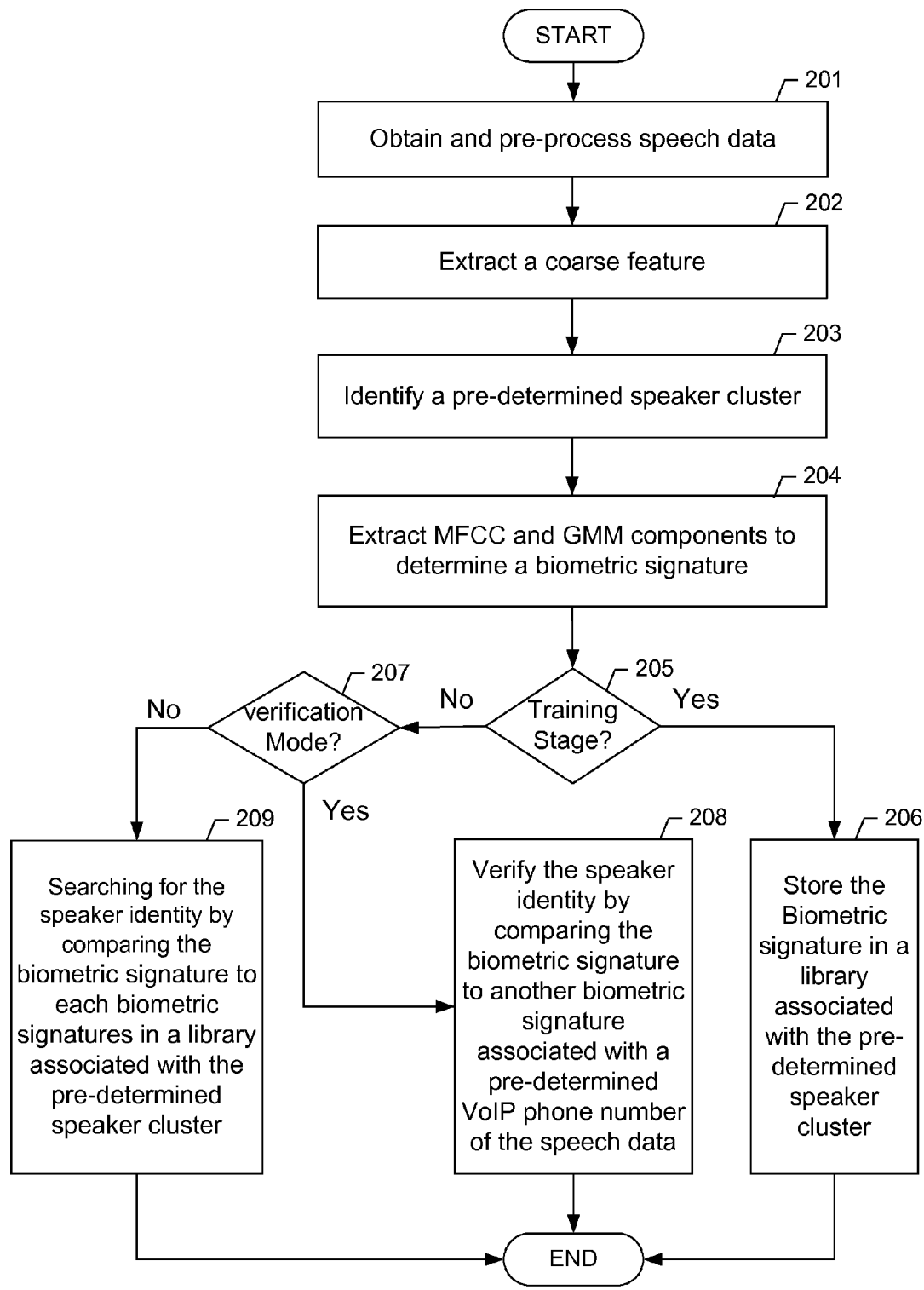
FIGS. 2A and 2B show flowcharts of a method according to aspects of the invention.
Figure 2B:
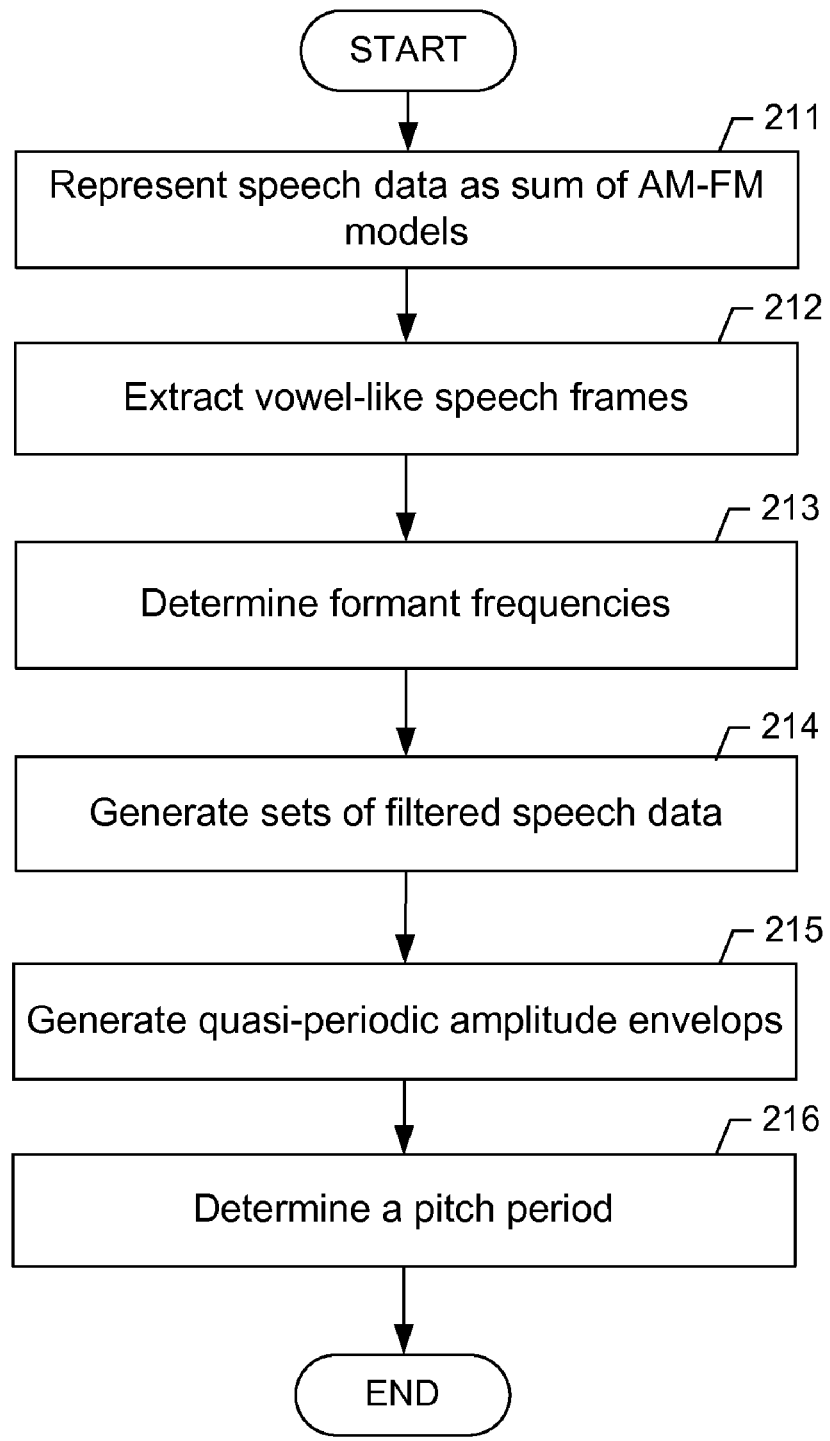

FIGS. 2A and 2B depict a flowchart of a method in accordance with one or more embodiments of the invention. In one or more embodiments of the invention, one or more of the steps shown in FIGS. 2A and 2B may be omitted, repeated, and/or performed in a different order. Accordingly, embodiments of the invention should not be considered limited to the specific arrangements of steps shown in FIGS. 2A and 2B. In one or more embodiments of the invention, the method depicted in FIGS. 2 and 3 may be practiced using system (100) described with respect to FIG. 1 above.

As shown in FIG. 2A, initially in Step 201, speech data of a speaker is obtained, for example from a VoIP network. In one or more embodiments, the speech data is obtained with the VoIP phone number of the phone call from which the speech data is obtained. Once obtained, the speech data is pre-processed, for example to define speech frames, to remove silent frames and over-saturated frames, as well as to normalize the speech data. In one or more embodiments, the speech data is less than 3 seconds in duration. More details of obtaining and pre-processing the speech data are described with respect to the example depicted in FIGS. 3A and 3B below.

In Step 202, a coarse feature of the speaker is extracted from the speech data. In one or more embodiments, the pitch (i.e., the period of the pitch) is used as the coarse feature of the speaker. More details of extracting the coarse feature of the speaker from the speech data are described with respect to the method depicted in FIG. 2B and the example depicted in FIGS. 3A and 3B below.

In Step 203, the speaker is identified as belonging to a pre-determined speaker cluster based on the coarse feature of the speaker. In one or more embodiments, the pre-determined speaker cluster is one of a number of hierarchical speaker clusters arranged in multiple hierarchies. For example, the hierarchies may include speaker gender cluster hierarchy, speaker native language cluster hierarchy, speaker age cluster hierarchy, etc. When the hierarchies includes two hierarchical levels, the clusters are referred to be in an 1-hop binary space, for example all speakers at the top hierarchical level is divided into two distinct clusters, for example as the speaker gender cluster hierarchy of male speaker cluster and female speaker cluster in an 1-hop binary space. More details of extracting the coarse feature of the speaker from the speech data are described with respect to the method depicted in FIG. 2B and the example depicted in FIGS. 3A and 3B below.

In Step 204, Mel-Frequency Cepstral Coefficients (MFCC) and Gaussian Mixture Model (GMM) components are extracted from the speech data. In one or more embodiments, MFCC are extracted for each speech frames while multiple sets of MFCC from these multiple speech frames are modeled using GMM with multiple GMM components. Once extracted, a biometric signature of the speaker is determined based on such coefficients and components. More details of extracting MFCC and GMM components from the speech data to determine biometric signatures are described with respect to the example depicted in FIGS. 3A and 3B below.

In Step 205, a determination is made as to whether the process is in a training stage or a testing stage. When it is determined that the process is in the training stage, the method proceeds to Step 206 where the biometric signature determined in Step 204 is stored in a biometric signature library associated with the pre-determined speaker cluster. For example, the biometric signature is store with the VoIP phone number of the speech data along with all owner identification information of the VoIP phone number. More details of the training stage and the biometric signature library are described with respect to the example depicted in FIGS. 3A and 3B below.

When it is determined in Step 205 that the process is in the testing stage, another decision is made in Step 207 as to whether the process is in speaker verification mode or in speaker identification mode. When it is determined that the process is in the speaker verification mode, the method proceeds to Step 208 where a biometric signature associated with the VoIP phone number of the speech data is retrieved from the biometric signature library to be compared to the biometric signature determined in Step 204 for verifying whether the speaker using the VoIP phone number is the registered user (e.g., owner) of the VoIP phone number. In one or more embodiments, the Steps 202 and 203 may be bypassed when the process is in the speaker verification mode. More details of the verification mode are described with respect to the example depicted in FIGS. 3A and 3B below.

When it is determined in Step 207 that the process is in the speaker identification mode, the method proceeds to Step 209 where the biometric signature determined in Step 204 is compared to each biometric signature in the biometric signature library associated with the pre-determined speaker cluster determined in Step 203 in search for a match, which is used to determined the identity if the speaker. In one or more embodiments, the speaker is identified as an unknown speaker and the biometric signature is identified as an unknown signature when no match is found. More details of the identification mode are described with respect to the example depicted in FIGS. 3A and 3B below.

As shown in FIG. 2B, initially in Step 211, the speech data is represented as a sum of amplitude modulation and frequency modulation (AM-FM) models corresponding to formant frequencies. Such formant frequencies are determined based on Steps 212 and 213 below. More details of representing the speech data using AM-FM models are described with respect to the example depicted in FIGS. 3A and 3B below.

In Step 212, a number of vowel-like speech frames are extracted from the speech data. More details of extracting vowel-like speech frames from the speech data are described with respect to the example depicted in FIGS. 3A and 3B below.

In Step 213, dominant formant frequencies are determined based on the vowel-like speech frames and the AM-FM models. More details of determining the dominant format frequencies are described with respect to the example depicted in FIGS. 3A and 3B below.

In Step 214, a set of filtered speech data are generated by band-passed filtering the vowel-like speech frames based on the dominant formant frequencies. More details of generating filtered speech data are described with respect to the example depicted in FIGS. 3A and 3B below.

In Step 215, quasi-periodic amplitude envelops (or envelop signals) are generated from the set of filtered speech data using discrete energy separation algorithm (DESA). More details of generating quasi-periodic amplitude envelops are described with respect to the example depicted in FIGS. 3A and 3B below.

In Step 216, a pitch period of the speaker is determined from the quasi-periodic amplitude envelops to be used as the coarse feature of the speaker. More details of determining the pitch period are described with respect to the example depicted in FIGS. 3A and 3B below.

Although specific formats or structures are used as examples in the foregoing description regarding the speech data, the speaker recognition engine, the biometric signature, the signature library, the repository, etc., one skilled in the art, with the benefit of this disclosure, will recognize that other formats or structures may also be used in the system and methods described without deviating from the spirit of the invention.

Figure 3A:
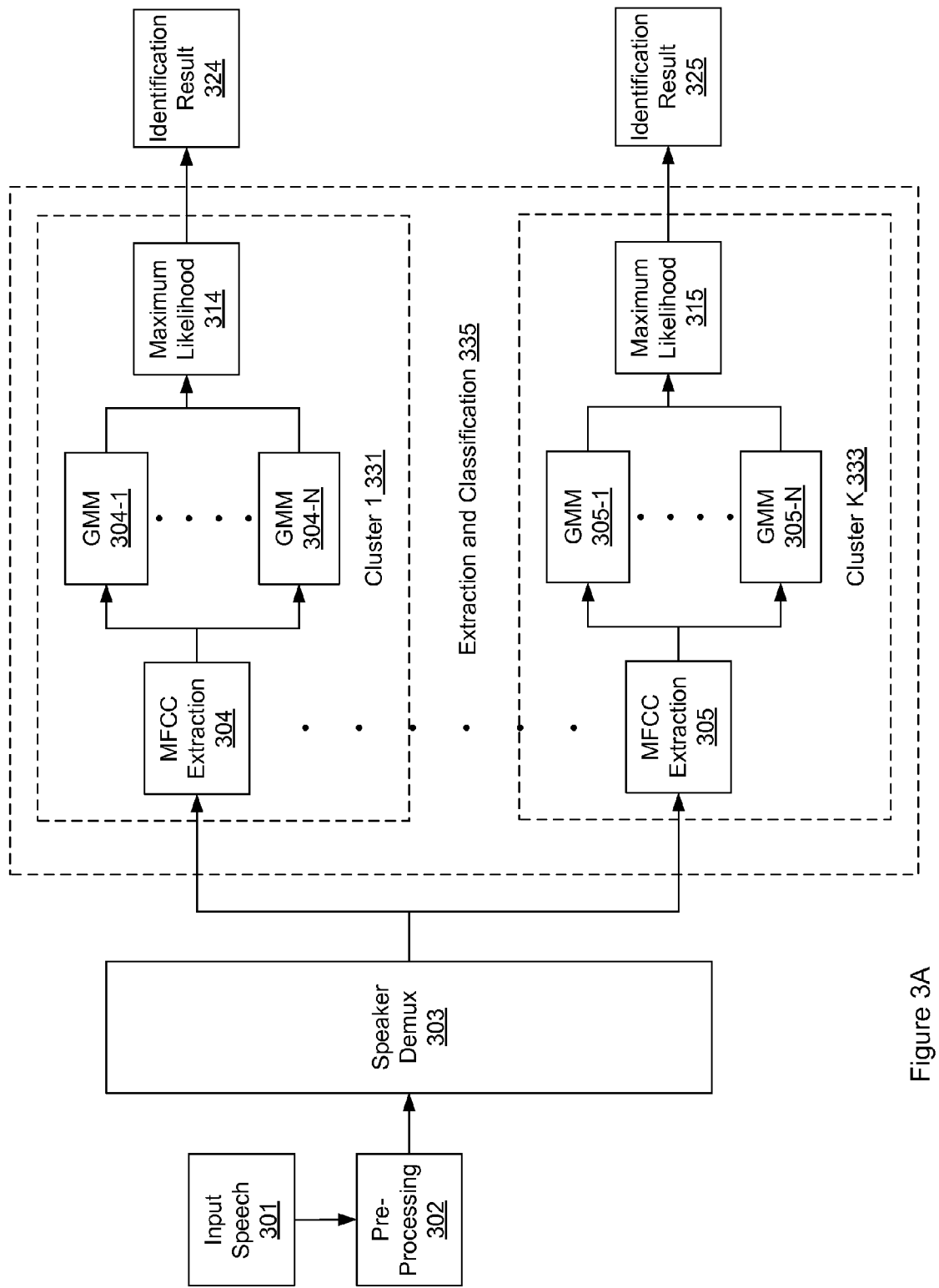
FIGS. 3A and 3B show an example according to aspects of the invention.
Figure 3B:
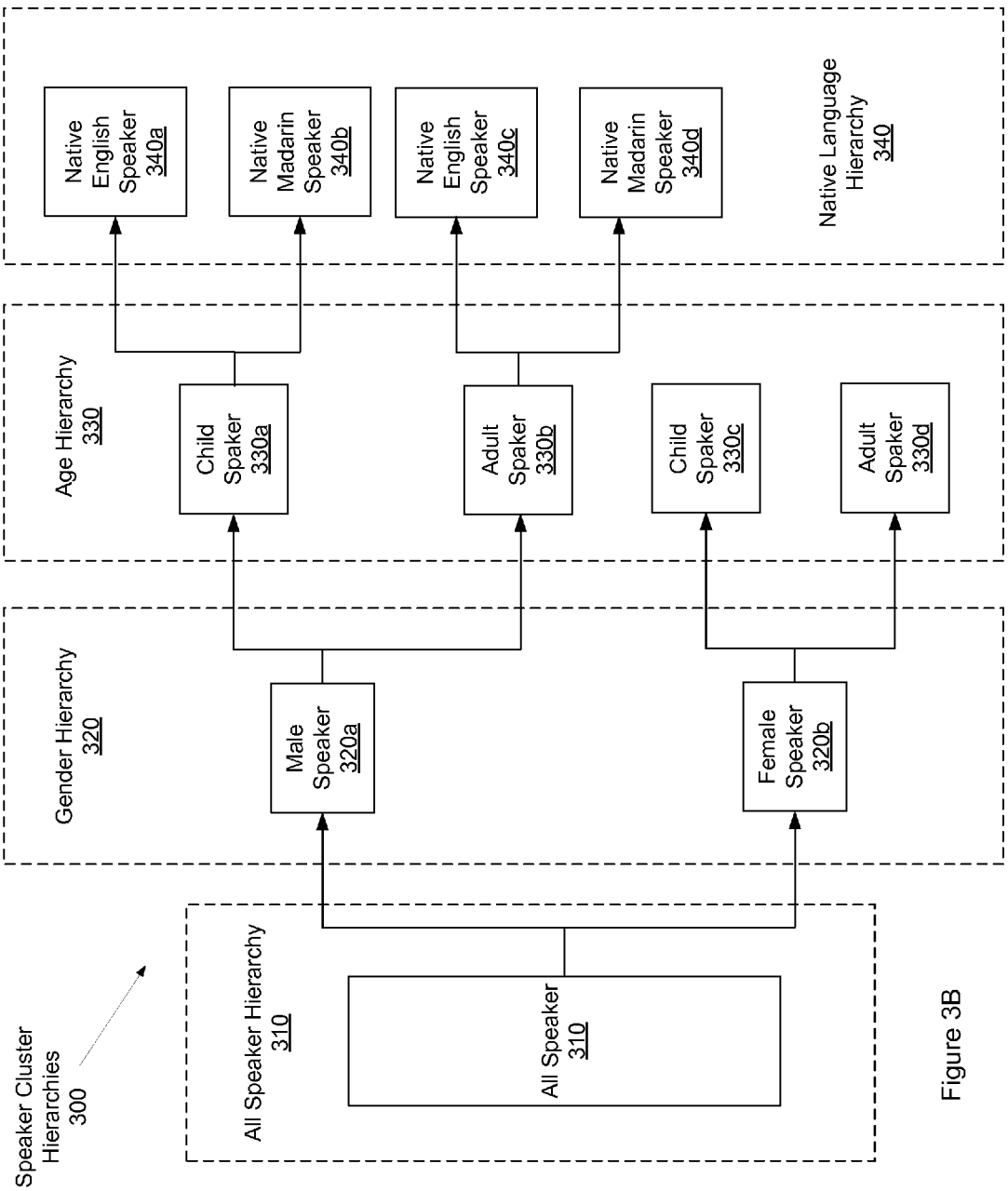

FIGS. 3A and 3B show an example according to aspects of the invention. In one or more embodiments of the invention, the example may be based on the method depicted in FIG. 2 and the system (100) described with respect to FIG. 1 above.

As discussed above, the speaker recognition problem may be solved in two stages: the training stage and the testing stage. Both these stages involve multiple processing steps, three of which are common. The common steps include: (i) pre-processing, (ii) feature extraction, and (iii) generating a reference model. The main goal of the training stage is to extract a signature for each of the speakers and store them in the library. In testing stage, the utterance under test may be compared with all the reference models in the library for making a decision based on a pre-determined threshold, for both a verification system and an identification system. The testing stage contains an additional classification step.

A speaker's utterance could vary over time, over different speaking manners and voice qualities (e.g., whispering, shouting, normal speaking, etc.), over different speaking rates and loudness levels, etc. Voice disguise and sickness could all be possible reasons in producing different sounding utterances.

In addition, the other variability comes from the recording conditions. An utterance could be recorded directly, through telephone or other channels under different environments. The real-time speaker recognition system (e.g., system (100) described in FIG. 1) is robust to such variations to increase the confidence of the estimation.

The example depicted in FIG. 3A includes several stages operating in cascade. First, the input speech signal (301) (e.g., the speech data (102) of FIG. 1) is passed through a pre-processing stage (302) (e.g., based on the pre-processor (112) of FIG. 1) that removes the silence frames, the oversaturated frames and finally normalizes the loudness level. The pre-processed signal is then forwarded via the speaker DeMux (303) to the feature extraction stage (e.g., based on the FCC/GMM extractor (114) of FIG. 1 and includes MFCC extraction (304, 305), GMM (304-1, 304-N, 305-1, 305-N, etc.)) and then to the classifier stage (e.g., based on the classifier (115) of FIG. 1, which uses GMM (304-1, 304-N, 305-1, 305-N, etc.) to determine maximum likelihood (314, 315, etc.) when matching the input speech (301) to each of the speaker clusters (331, 333, etc.)). More details of the DeMux (303) operations are described later in the description of FIG. 3A. In addition, the DeMux (301) is based on speaker cluster hierarchies for its operation. More details of the speaker cluster hierarchies are described with respect to FIG. 3B below.

In the feature extraction and classification stage (335), the Mel-Frequency Cepstrum Coefficients (MFCC) are extracted after dependency from the channel being used (e.g., microphones, etc.) are removed from the speech signal. The MFCC are extracted for multiple frames of the input speech signal (301) are statistically analyzed to generate a Gaussian Mixture Model (GMM). The GMM (e.g., 304-1, 304-N, 305-1, 305-N, etc.) is then used as biometric signatures and stored in the biometric signature libraries (e.g., each associated with one of cluster 1 (331) through cluster N (333)).

The configuration of GMM on top of MFCC is executed both during the training and testing stages. In particular, during the training stage, the GMM may include parameters estimated using Expectation Maximization (EM) algorithm. During the testing stage, the GMM obtained for the utterance under test (i.e., input speech (301)) is compared to all GMM models of the registered speakers stored in the library in search for the one with best match. This is referred to as speaker identification where the decision is made according to a Maximum Likelihood (ML) criterion.

The purpose of the pre-processing stage (302) is to refine the input data samples (e.g., input speech (301)) to alleviate the effects that will degrade the further classification performance. For example, the pre-processing stage (302) removes (i) the silence frames and the (ii) over saturated frames as well as (iii) normalize the loudness of all the utterances during both training and testing stages.

Based on the fact that silence frames have lower energy level than speech frames, silence removal may be performed by removing all the frames with energy level lower than a pre-determined threshold. This threshold may be learned from some recording of pure silence utterances. In the description below, the input speech (301) is assumed to be a short-time stationary process, which means in a short time period, the speech signal is the production of a fixed excitation through a fixed filter.

The raw input utterance signal (e.g., input speech (301)) may be modeled as a discrete time series $s(n)$ where $n = 1, \ldots, N$. In order to operate the short-time frequency analysis, the original utterance signal (e.g., input speech (301)) is segmented into short time periods which are defined as frames with frame rate denoted as p frames/second, sample frequency denoted as $f_s$ Hz, frame width denoted as w samples. Since $w*f_s$ does not have to be equal to 1/p, consecutive frames may be overlapped. Then each utterance can be represented as a set of windowed speech frames $S=\{s_1, s_2, \ldots s_T\}$ where T represents the number of frames and for $i=1, \ldots, T$, $s_i=[s((i-1)w), s((i-1)w+1), \ldots, s((i-1)w+w-1)]$.

Next, the silence removal is performed by comparing the variance $\text{Var}(s_i)$ with a given threshold $\text{th}_{silence}$. If $\text{Var}(s_i) < \text{th}_{silence}$, then $s_i$ is identified as a silence frame, otherwise $S_i$ is identified as a valid speech frame. The value of $\text{th}_{silence}$ may be estimated based on recording of pure silence. We are still looking for some advanced Further, when the speaker speaks too loudly or happens to blow some air into the microphone, the signal strength will likely be out of the range for the microphone to measure. Then "pu" sound may be heard in the recorded speech. Such distorted frames have unpredictable influence on the speaker recognition operations and may be removed by removing each frame containing a signal exceeding a pre-determined threshold.

Furthermore, from time to time, speakers may speak with different levels of loudness. An original utterance signal s(n) may be normalized into s'(n) by dividing the original utterance signal over the square root of its variance $\text{Var}(s(n))$ (computed over the entire utterance) and then scaling the result by a preset constant $C_{var}$. In mathematical terms, s'(n) is computed as $$\frac{C_{var}}{\sqrt{\text{Var}(s))}} s(n)$$

with $n=1, 2, \ldots N$.

After the silence/over-saturated frames are removed and loudness is normalization, the pre-processing stage (302) outputs the set of voice frames $S'=\{s_1', s_2', \ldots, s_T'\}$, which will be used during the feature extraction and classification stage (335). In the description below, the upper index is suppressed for ease of exposition and refer to the set $S'=\{s_1', s_2', \ldots, s_T'\}$ as $S=\{s_1, s_2, \ldots, s_T\}$.

Generally speaking, a generic digital voice signal s(n) generated from an excitation process going through a vocal tract may be modeled as the convolution of the excitation signal e(n) with the transform function of the vocal tract h(n), i.e., s(n)=e(n)*h(n). The use of the Fourier domain transforms the convolution operator into the multiplication operator. Further, a logarithm function on the Fourier transform transforms the multiplication operator into the addition operator. As is known in the art, the use of MFCC domain transforms a convolution of two signals in the spatial domain into their summation in the new MFCC domain. In the description below, MFCC values for each frame $S_i$ in S is denoted as $X_i$.

Cepstrum is a homomorphic transformation that separates the source signal h(n) from the filter e(n). The homomorphic transformation $\hat{s}(n)=D(s(n))$ is a transformation that converts a convolution $s(n)=e(n)*h(n)$ into a summation $\hat{s}(n)=\hat{e}(n)+\hat{h}(n)$. It can be shown that a value N exists such that the cepstrum of the filter $\hat{h}(n) \approx 0$ for $n=N$, and the cepstrum of the excitation $\hat{e}(n) \approx 0$ for $n<N$. Accordingly, both e(n) and h(n) may be approximately recovered from the original signal by homomorphic filtering. If we define $l(n)=1$ for $|n|<N$ and $l(n)=0$ for $|n|=N$, we can recover $\hat{h}(n)=\hat{s}(n) \times l(n)$ and $h(n)=D^{-1}(\hat{h}(n))$.

Let's denote the Fourier transform of s(n) as $S(e^{jw})$. The real cepstrum cp(n) of signal s(n) is defined as $$cp(n) = \frac{1}{2\pi} \int_{-\pi}^{\pi} \ln|S(e^{jw})| e^{jwn} dw \tag{1}$$

and the complex cepstrum $\hat{s}(n)$ is defined as $$\hat{s}(n) = \frac{1}{2\pi} \int_{-\pi}^{\pi} \ln S(e^{jw}) e^{jwn} dw \tag{2}$$

where the complex logarithm is used $$\hat{S}(e^{jw}) = \ln(S(e^{jw})) = \ln|S(e^{jw})| + j\theta(w) \tag{3}$$

MFCC is then a representation defined as the real cepstrum of a windowed short-time signal derived from the FFT (Fast Fourier Transform) of the signal. The difference from the real cepstrum is that a nonlinear frequency scale is used, which approximates the behavior of the auditory system. Given the DFT of the input signal $$S_a(k) = \sum_{n=0}^{N-1} s(n) e^{-j2\pi nk/N}, \quad 0 \le k < N \tag{4}$$

we define a filter bank with Al filters (m=0, 1, …, M) where the generic filter m is a triangular filter given by, Hm(k), $$\begin{cases} 0 & k < f(m-1) \\ \frac{2(f(m+1)-k)}{(f(m+1)-f(m-1))(f(m)-f(m-1))} & f(m-1) \le k < f(m) \\ \frac{2(k-f(m-1))}{(f(m+1)-f(m-1))(f(m+1)-f(m))} & f(m) \le k < f(m+1) \\ 0 & k \ge f(m+1) \end{cases} \tag{5}$$

We define $f_l$ and $f_h$ to be the lowest and highest frequencies of the filter bank in Hertz (Hz), $F_S$ the sampling frequency in Hz, M the number of filters, and N the size of the FFT. The boundary points f(m) are uniformly spaced in the mel-scale:

$$f(m) = \left(\frac{N}{F_s}\right) B^{-1}\left(B(f_l) + m \frac{B(f_h)-B(f_l)}{M+1}\right) \tag{6}$$

where the mel-scale $B$ is given as $$B(f)=1125 \ln(1+f/700) \tag{7}$$

and $B^{-1}$ is its inverse and computed as $$B^{-1}(b)=700(e^{b/1125}-1) \tag{8}$$

We then compute the log-energy at the output of each filter as $$O(m) = \ln\left[\sum_{k=0}^{N-1} |S_a(k)|^2 H_m(k)\right], \quad 0 < m \le M \tag{9}$$

The mel-frequency cepstrum is then the discrete cosine transform of the M filter outputs since the inverse Fourier transform is equivalent to a cosine transform when we use even extrapolation of the original signal for Fourier transform.

$$c(n) = \sum_{k=0}^{N-1} O(m)\cos(\pi n(m-1/2)/M),\ 0 \le n < M \quad (10)$$

where M varies for different implementations from 24 to 40.

It is important to note that the MFCC representation is no longer a homomorphic transformation. It would be if the order of summation and logarithms in Equation (9) were reversed:

$$O(m) = \ln\left[\sum_{k=0}^{N-1}\right] \ln(|S_a(k)|^2 H_m(k)),\ 0 < m \le M \quad (11)$$

In practice, however, the MFCC representation is approximately homomorphic for filters that have a smooth transfer function. The advantage of the MFCC representation using Equation (9) instead of Equation (11) is that the filter energies are more robust to noise and spectral estimation errors.

As mentioned before, the first step in the pre-processing stage (301) is to segment the original amplitude signal into frames, which may be performed using a hamming window. Hamming window has less energy leak and higher frequency resolution compared with rectangular window. For the input signal s(n), the windowed frames set is $S=\{s_1, s_2, \ldots, s_T\}$ where the MFCC for each frame $s_i$ as $x_i$ and extract a feature vector set $X=(x_1, x_2, \ldots, x_T)$ where $x_i$ is a feature vector corresponding to the frame $s_i$. To be noted, the dimension of $x_i$ is usually smaller than the dimension of $s_i$. A pre-emphasis step (e.g., a first-order FIR filter y(n)=x(n)−Kx(n−1)) may be applied before applying the mel-scale filter banks. Since voice speech has a downward trend of −6 dB/octave toward the high frequency, the low frequency part of speech is implicitly assigned higher weights than the high frequency part when we calculate distances. The high concentration of energy in the low frequency range observed for most speech spectra makes the energy of the signal at middle and high frequencies less relevant. Moreover, due to the fact of cosine transform, MFCCs would take the value of zero if the input signal is white noise. On the other hand, for some unvoiced fricatives and plosives, the coefficient values are also approximately zero. This phenomenon introduces ambiguity between unvoiced phoneme and white noise. This ambiguity could be alleviated by making the spectrum of unvoiced sounds more relevant through the use of pre-emphasis.

All the speech samples collected are actually the outcome of original speech waveforms passing through certain "channel". This "channel" usually includes the air channel between the speaker and the microphone, the microphone itself as a filter, the land phone wire, the wireless channel for a cellphone and the Internet cables. Among these factors, the sampling frequency of the A/D converter and the spectral reshaping effect from analog devices will influence the speaker recognition system the most. For example, if we use one microphone to collect training data and another microphone to collect testing data, we will probably get very poor recognition results. The speech signal s(n) passing through a microphone can be modeled as source signal z(n) convoluted by a transform function g(n) as s(n)=z(n)*g(n). It can be represented in MFCC as ŝ(n)=ẑ(n)+ĝ(n). Different microphones means different transform functions g(n). When using different microphones in training and testing, we are actually testing ŝ(n)=ẑ(n)+ĝ$_2$(n) with a model generated from ŝ(n)=ẑ(n)+ĝ$_1$(n). If ĝ$_1$(n)≠ĝ$_2$(n) the result will be inaccurate. In order to make the speaker recognition system robust to different g(n), we can use the characteristic that MFCC can transform convolution into summation. Suppose we have several samples collected from the same channel g(n) but different speakers, we can write them as s ŝ$_t$(n)=ẑ$_t$(n)+ĝ(n) where ŝ$_t$(n) and ẑ$_t$(n) are varying with time but ĝ(n) is constant over time. These samples ŝ$_t$(n) are from different speakers with different phonemes. If t and the number of different speakers are large enough, we can assume m̂(n)=1/T Σ$_{t=1}^T$ŝ$_t$(n)=ĝ(n)+c, where c is a constant. Then we can get channel independent features as ŝ'(n)=ŝ$_t$(n)−m̂(n). We can repeat the above procedures for different channels we have to may our recognition system independent to the spectral variations from channel. Similarly, we can use the cepstrum difference coefficients Δŝ$_t$(n)=ŝ$_t$(n)−ŝ$_{t-W}$(n) as the channel invariant features, where W is a constant corresponding to a time delay. It uses the same idea that channel dose not change over time.

The representative features obtained above are used for classifying speakers in the extraction and classification stage (331). A classifier (e.g., 115) used for this stage uses labeled training data to train its parameter before it is ready to classify speakers based on the representative features. During the training stage, a feature vector set $X=\{x_1, x_2, \ldots, x_T\}$ is extracted for each utterance being recorded for each registered speaker. Each $x_i$ of X represents MFCC extracted from a frame of the pre-processed input speech signal. For effective speaker identification, the speaker dependent characteristics is retained while the content dependent characteristics is suppressed based on the following methodology.

In an implementation example, M=40 filter banks and the first 26 cepstrum coefficients for each feature vector are used. So each $x_i$ is represented as a 26-dimensional vector. In order to capture these coefficients over multiple frames, a Gaussian Mixture Model (GMM) with 32 components is used resulting in 32 Gaussian distributions in a 27 dimensional space where the extra dimension $p(x_i)$ is added to represent the probability density of the 26 dimensional vector $x_i$.

In this example implementation, Expectation Maximization (EM) algorithm is used to estimate the parameters of the GMM with an assumption that the covariance matrices for the 32 Gaussian components are diagonal and nodal. In addition, a minimum variance limit of 0.01 is used in the EM algorithm.

After the training stage, each registered speaker j may be modeled by a GMM (e.g., 304-1, 304-N, 305-1, 305-N, etc.) with parameters $\theta_j=(\mu_{i,j}, \Sigma_{i,j}, \pi_{i,j})$ where $\mu_{i,j}$ with i=1, 2, ..., 32 are the means of the 32 components; $\Sigma_{i,j}$ with i=1, 2, ..., 32 are the covariance matrices of the 32 components and $\pi_{i,j}$ with i=1, 2, ..., 32 are the prior probabilities of the 32 components. This parameter set $\theta_j$ is considered as the voice fingerprint (i.e., biometric signature) of the registered speaker j and is stored in a biometric library for all these registered speaker j with j being an index from 1 through N. An example of such biometric library is GMM (304-1, 304-N, etc.) for speaker cluster 1 (331). Another example of such biometric library is GMM (305-1, 305-N, etc.) for speaker cluster 1 (333).

In the testing stage, another feature vector set $X=\{x_1, x_2, \ldots, X_T\}$ is extracted in real time from the input speech of a target. For each feature vector $X_1$ of X (representing MFCC extracted from a frame of the pre-processed input speech of the target) and a speaker model $\theta_j$ of the biometric signature library, a probability density may be calculated as:

$$p(x_t \mid \theta_j) = \sum_{i=1}^{32} \pi_{i,j} G(x_t \mid \mu_{i,j}, \Sigma_{i,j}) \qquad (12)$$

An assumption is made that all the feature vectors $x_t$ are independent to each other, and thus mathematically:

$$p(X \mid \theta_j) = \prod_{t=1}^{T} p(x_t \mid \theta_j) \qquad (13)$$

Equation (13) may be normalized to remove the influence of the length of the utterance as:

$$p(X \mid \theta_j) = \sqrt[T]{\prod_{t=1}^{T} p(x_t \mid \theta_j)} \qquad (14)$$

Here, $p(X\mid\theta_j)$ is the likelihood that the speaker j is the target, i.e., the person who produces the input speech with the feature vector set X. Since $p(X\mid\theta_j)$ is a value of probability density, its value is in the range of $[0, \infty)$. Through mapping of $y=1-e^{-x}$, a confidence value is derived as $1-e^{-p(X\mid\theta_j)}$ with a range of $[0, 1)$ and expressed as a percentage score.

The speaker recognition performance of the example process steps described above tends to degrade quite severely when the number N of registered speakers in the library grows beyond 1,500. In order to increase the scalability, Speaker DeMux (303) is employed based on grouping speakers with similar voice fingerprints in the same cluster (e.g, one of cluster 1 (331), cluster N (333), etc.), and speakers with dissimilar voice fingerprints into different clusters (e.g, cluster 1 (331) versus cluster N (333), etc.). Different clusters can be loaded into different partitions of a library or completely different libraries. A speaker is always associated to one and only one cluster. The speaker recognition operates as described above for both training and testing within each cluster separately. During the classification stage, only a specific partition of the library (or a specific library) will be enabled according to which cluster the Speaker DeMux (303) selects for the target input speech signal.

As an example, the Speaker DeMux (303) identifies a testing speaker target as male or female by extracting specific voice features. In this case, the Speaker DeMux (303) is said to DeMux the entire speaker space into a 1-hop binary space with two distinct clusters, one for males and one for females. During the testing stage, biometric signatures of all male registered speakers are loaded into the biometric signature library (e.g., GMM (304-1, 304-N, etc.)) of the first cluster (e.g., cluster 1 (331)), while biometric signatures of all female registered speakers are loaded into the biometric signature library (e.g., GMM (305-1, 305-N, etc.)) of another cluster (e.g., cluster K (333)). The associated reference models $\theta_j = (\mu_{i,j}, \Sigma_{i,j}, \pi_{i,j})$ are created as discussed above within each cluster. When a voice sample is provided during the testing stage, the Speaker DeMux (303) identifies whether the unknown speaker is male or female and automatically enables only the cluster in which the unknown speaker is most likely to reside. For example, in case of male being the most likelihood (314), then the Speaker DeMux (303) enables the male cluster and disables the female cluster. At this point, the operations will be performed to identify which of the male speakers (i.e., the identification result (324)) is most likely to be the unknown speaker within the male cluster. Similarly, in case of female being the most likelihood (315), then the Speaker DeMux (303) enables the female cluster and disables the male cluster. At this point, the operations will be performed to identify which of the female speakers (i.e., the identification result (325)) is most likely to be the unknown speaker within the male cluster. While based on the flat architecture the speaker recognition process can compare in real time no more than 1,500 registered speakers (e.g., 750 males and 750 females), with the addition of the Speaker DeMux (303) the speaker recognition process can now compare in real time up to 3,000 registered speakers in the two separate biometric signature libraries. For a generic 10-hops binary space with 10 hierarchies having $2^{10}=1,024$ clusters, the speaker recognition process can compare in real time 1,024*1,500 or approximately 1.5 million registered speakers.

The operations of the Speaker DeMux (303) are described in detail below in several example process steps E.1 through E.6. Furthermore, the speaker cluster hierarchies are described with respect to FIG. 3B below. In step E.1, the short-time speech signal (e.g., 301) is modeled as sums of amplitude modulation and frequency modulation (AM-FM) formant models. Each AM-FM model corresponds to one formant and describes one speech resonance as a combined AM and FM structure. Thus, a given speech signal can be decomposed into modulations, namely the signal's amplitude envelopes and instantaneous frequencies. The period of the quasi-periodic amplitude envelope is a good estimation of the pitch which provides a coarse classification of speakers into several distinct clusters. The Mel-Frequency Cepstral Coefficients (MFCC) of the amplitude envelope is then expected to offer a fine classification for determining the identity of a speaker within a cluster. In the real-time speaker recognition system as an example, a 25 ms vowel-like speech frame is firstly extracted from the fluent speech based on energy properties. After pre-emphasis and windowing, the extracted frame is further divided into 5 shorter segmentations and for each segmentation, formants are estimated by linear prediction analysis and root-finding algorithm. Both the largest and smallest estimated formants are dropped and the mean value of the remaining three is taken as the final estimation. By doing this, the possible formant fluctuation is eliminated and the more accurate formant estimation may be achieved. The vowel-like frame is subsequently bandpass filtered around its formants such that corresponding AM and FM signals are separated by implementing the discrete energy separation algorithm (DESA). Afterwards, the pitch may be obtained by detecting the largest non-DC peak in the power spectrum of the amplitude envelope. In addition, the MFCC of the amplitude envelope is also calculated. As indicated in experiments conducted for both English and Mandarin speech, the pitch parameter remains stable for different vowel sounds uttered by the same speaker and the MFCC of the amplitude envelope is essentially phoneme-independent.

In the following step E.1, the decomposition of the pre-extracted short-time voice frames S into summations of AM-FM formant models (i.e., time varying amplitude a(t) and instantaneous frequency f(t)) are described. In addition, the use of the period of the quasi-periodic amplitude envelope a(t) as an estimation of the to provide a coarse classification of speakers into male and female clusters is also described.

E.1 Decomposition of Short-Time Speech Signals into Sums of AM-FM Formant Models:

From the theoretical point of view, during speech production, the air jet flowing through the vocal tract is highly unstable and oscillates between its walls. Hence, it changes the effective cross-sectional areas and air masses and affects the frequency of a speech resonance. Meanwhile, vortices can easily build up and encircle the air jet passing through. These vortices can act as modulators of the air jet energy. Moreover, it is well known that slow time variations of the oscillator elements can result in amplitude or frequency modulation. Thus, during speech production, the time-varying air masses and effective cross sectional areas of vocal tract cavities that rapidly vary following the separated airflow can cause modulations. Also from experiment, if the energy operator is applied in the bandpass filtered speech vowel signals around their formants, several pulses per pitch period are often yielded. These energy pulses indicate some kind of modulation in each formant. Based on the above, the AM-FM model is a nonlinear model that describes a speech resonance as a signal with a combined amplitude modulation (AM) and frequency modulation (FM) structure:

$$r(t) = a(t)\cos(\omega_c t + \omega_m \int_0^t q(\tau)d\tau + \theta) \quad (15)$$

where $\omega_c$ is the "center value" of the formant frequency, $q(t)$ is the frequency modulating signal, and $a(t)$ is the time-varying amplitude. The instantaneous formant frequency signal is defined as $$\omega_i = \omega_c + \omega_m q(t) \quad (16)$$

The total short-time speech signal $s(t)$ is modeled as sums of K such AM-FM signals, one for each formant as below:

$$s(t) = \sum_{k=1}^{K} r_k(t) \quad (17)$$

Based on the sums of AM-FM formant models, and utilizing the energy operators, all AM-FM resonances can be separated by bandpass filtering the speech signal around all its formants. Each resonance is processed by energy separation algorithm and decomposed into AM component and FM component. The feature for speaker recognition may then be extracted in this way.

E.2 Vowel-Like Speech Frame Extraction

Segmentation of the fluent speech waveform is performed to determine which frames are vowel-like. After the vowel-like frames are obtained from the fluent speech, features may then be extracted from these frames for speaker recognition by formant estimation, energy separation, pitch detection and Mel-Frequency Cepstral Coefficients (MFCC) calculation. Because the acoustic characteristics of the obstruent sounds are not well represented through formants and the spectral characteristics of the noise source tend to mask the vocal tract resonances, the formants tracking are only suitable to the sonorant speech. Furthermore, pitch feature can only be obtained from voiced sounds. Thus, vowel-like speech is the best candidate to be used real-time speaker recognition. The voiced sound often contains more energy in the frequency band of 200 Hz to 700 Hz than other classes of sounds. The sonorant sound often has a relatively higher ratio of the energy in the frequency bands 0 Hz to 300 Hz and 3700 Hz to 7000 Hz than other classes of sounds. Thus, vowel-like segmentations may be extracted based on these two features. The first step is to extract frames whose total spectral energy in the frequency band of 200 Hz-700 Hz is relatively high among all the frames. Here, the short-time analysis interval extracted from the long-time fluent speech wave is called a frame. The length of the frame (or frame length) is 25 ms long and the frame shifting interval (or the frame interval) is 3 ms long. Voiced frame is considered to have a relative high energy in the frequency band of 200 Hz-700 Hz. Thus, frames may be selected as a possible voiced frame based on this partial-band energy comparison. In practice, top 5% of all frames having a relatively high energy in the frequency band of 200 Hz-700 Hz are selected as the voiced frame candidates. Then, for all the selected voiced frames, the energy ratio in the frequency bands 0 Hz-300 Hz and 3700 Hz-7000 Hz are calculated. Sonorant frame is considered to have a relatively high ratio value. Hence, according to the ratio values, all the voiced frames are ordered and the frames having relatively high ratio values may be determined as vowel-like frames.

E.3 Pre-Emphasis and Windowing

The pre-emphasis pre-filtering is used to condition the input speech frame before any further analysis. From a theoretical point of view, a proper pre-filter may remove the effects of glottal wave shape and the radiation characteristics of the lip. This will leave the all-pole vocal tract filter for analysis without wasting the Linear Predictive Coding (LPC) poles on glottal and radiation shaping. From a spectrum point of view, any preliminary flattening of the overall input spectrum before LPC processing improves the LPC analysis for spectrum flattening. Said in other words, proper speech pre-emphasis reduces the order of an LPC fit necessary for an equivalent spectrum match. Finally, from the point of view of a finite word length implementation, the proper pre-emphasis reduces numerical error. Because the LPC analysis is used to estimate formant frequencies, the speech signal pre-emphasis needs to be performed by calculating first-order difference. The new filtered speech signal is given by $$s_n' = s_n + as_{n-1} \quad (18)$$

where $s_n$ is the input speech signal and $s_n'$ is the pre-emphasis filtered speech signal. An optimal value may be obtained by solving for the filter that makes "white". This is given by the first order predictor, where $$a = -\frac{R(1)}{R(0)}.$$

$R(1)$ and $R(0)$ are autocorrelation coefficients of the input speech signal. The filtered signal is then guaranteed to have a smaller spectral dynamic range. In order to extract a short-time interval from the pre-emphasis filtered speech signal for calculating the autocorrelation function and spectrum, the pre-emphasis filtered speech signal must be multiplied by an appropriate time window. The multiplication of the speech signal by the window function has two following effects. First, it gradually attenuates the amplitude at both ends of the extraction interval to prevent an abrupt change at the endpoints. Second, the multiplication of the speech wave by an appropriate window reduces the spectral fluctuation due to the variation of the pitch excitation position within the analysis interval. This is effective in producing stable spectra during the analysis of vowel-like sounds featuring clear pitch periodicity. As the windowing produces the convolution for the Fourier transform of the window function and the speech spectrum, or the weighted moving average in the spectral domain, it is thus desirable that the window function satisfy two characteristics in order to reduce the spectral distortion caused by the windowing. One is a high-frequency resolution, principally, a narrow and sharp main lobe. The other is a small spectral leak from other spectral elements produced by the convolution, in other words, a large attenuation of the side lode. In the example process depicted in FIG. 3A, hamming window is adopted.

E.4 Formant Estimation

Formant frequency is one of the most useful speech parameters to be specified by a vocal tract shape or its movements in various pronunciations. As noted above, the total short-time speech signal s(t) is modeled as the sums of K AM-FM signals, one for each formant. The formants are physically defined as poles in a system function expressing the characteristics of a vocal tract. Capturing and tracking formants accurately from natural speech is complicated by the variety of speech sounds. The frequencies at which the formants occur are primarily dependent upon the shape of the vocal tract, which is determined by the positions of the articulators (i.e., tongue, lips, jaw. etc.). In continuous speech, the formant frequencies vary in time as the articulators change position. Methods based on the best matching between a spectrum to be analyzed and a synthesized one such that formant frequencies are estimated through spectral shapes may be sensitive to spectral distortion and modifications. In the example process depicted in FIG. 3A, after preprocessing by pre-emphasis and windowing, the 25 ms vowel-like speech frame is first separated into 5 shorter segmentations, each of which lasts for 5 ms. Then the linear prediction analysis is applied for each 5 ms segmentation to obtain the linear prediction coefficients that optimally characterize its short-time power spectrum. Generally, the power spectral shape has a smaller change within such a shorter interval, thus the LPC analysis of these shorter segmentations are more robust to spectral distortion and modifications. Root-finding algorithm is then employed to find the zeros of the LPC polynomial. The zeros correspond to peaks in the short-time power spectrum and thus indicate the locations of the formant frequencies. The transformation from complex root pairs $z=re^{\pm j\theta}$ and sampling frequency $f_x$ to formant frequency F and −3 dB bandwidth B are as follows:

$$F = \frac{f_s}{2\pi}\theta \text{ Hz} \tag{19}$$

$$B = -\frac{f_s}{\pi}\ln r \text{ Hz} \tag{20}$$

The order selection of the LPC model is important to accurate formant estimation. If the order is chosen smaller, the short-time power spectrum cannot be fully characterized and it may lead to missing peaks. If chosen larger, the speech signal is over-determinedly modeled and spurious peak may occur. In the example process, the order to be used for the analysis is set to be 30. As more than one zeros of the LPC polynomial can be found, thus more than one formant frequencies are obtained. Three of these are selected in which most of the speech energy is contained. The energy of the bandpass filtered speech signals are compared around all its estimated formant frequencies and three largest ones and corresponding formant frequencies are selected. Here, Gabor filter is used as the bandpass filter, whose impulse and frequency responses are $$h(t) = e^{-\alpha^2 t^2}\cos(\omega_c t) \tag{21}$$

$$H(w) = \frac{\sqrt{\pi}}{2\alpha}\left(e^{-\frac{(\omega-\omega_c)^2}{4\alpha^2}} + e^{-\frac{(\omega+\omega_c)^2}{4\alpha^2}}\right) \tag{22}$$

where $\omega_c$ is the center value of the formant frequencies obtained above. The reasons for selecting the above bandpass filter are twofold: (i) It is optimally compact in the time and frequency width product assumes the minimum value in the uncertainty principle inequality; (ii) The Gaussian shape of $H(\omega)$ avoids producing side-lobes (or big side-lobes after truncation of h(t)) that could produce false pulses in the output of the latter energy separation. Here, the bandwidth of the Gabor filter needs to be determined properly for the bandpass filtering. The −3 dB bandwidth of the Gabor filter is equal to $$\frac{\alpha}{\sqrt{2\pi}}.$$

The bandwidth should not be too wide because then they will include significant contributions from neighboring formants which may cause parasitic modulations. On the other hand, the Gabor filters should not have a very narrow bandwidth because this would miss or deemphasize some of the modulations. In the example process, a −3 dB bandwidth of 400 Hz is used with satisfactory results. As there are 5 segmentations for each vowel-like frame, 5 sets of estimated formant frequencies are obtained, each of which has 3 frequencies. Generally, the articulators cannot move too much within 5 ms. Thus, estimated formants in each set are close to each other. However, formant frequencies sometimes do change considerably within 5 ms, as at the boundary between a nasal and a vowel. In order to avoid introducing the sudden change of formants and to improve the estimation accuracy, for each group of 5 estimated formants in 5 sets respectively, the maximum estimated value and the minimum estimated value are eliminated and take the average of the rest three as the final formant estimation. By doing this, the possible formant fluctuation at the boundary between a nasal and a vowel are eliminated and the more accurate formant estimation is expected to be yielded.

E.5 Energy Separation

In this last stage, three formant frequencies obtained and the 25 ms vowel-like speech frame is respectively bandpass filtered around the three formants. Thus three bandpass filtered speech signals are obtained, which correspond to three dominating AM-FM resonance components. They are then processed by energy separation algorithm to decompose AM component and FM component. The "energy-tracking" operator is used to estimate its amplitude envelope |a(t)| and its instantaneous frequency $\omega_i(t)$. For continuous-time signal, the energy operator is defined as:

$$\phi_c[x(t)] = [\dot{x}(t)]^2 - x(t)\ddot{x}(t) \tag{23}$$

For discrete-time signal, the energy operator is defined as $$\phi_d[x(n)] = x^2(n) - x(n-1)x(n+1) \tag{24}$$

where n=0, ±1, ±2, . . . . It can be concluded that for any constants A and $\omega_c$, the following equation holds:

$$\phi_c[A\cos(\omega_c t + \theta)] = (A\omega_c)^2 \tag{25}$$

For time-varying amplitude and frequency, the following equation holds:

$$\phi_c[a(t)\cos(\int_0^t \omega_i(\tau)d\tau + \theta)] = (a(t)\omega_i(t))^2 \tag{26}$$

Assuming that the signals $\alpha(t)$ and $\omega_i(t)$ do not vary too fast in time compared to $\omega_c$. Thus, the combined use of the energy operator on the AM-FM signal and its derivative (or difference) can lead to an effective algorithm for separately estimating the amplitude signals and the frequency signals. In the example process, the discrete-time signal is considered. The discrete energy separation algorithm (DESA) is shown as follows:

$$x(n) - x(n-1) = y(n) \quad (27)$$

$$\arccos\left(1 - \frac{\psi[y(n)] + \psi[y(n+1)]}{4\psi[x(n)]}\right) \approx \omega_i(n) \quad (28)$$

$$\sqrt{\frac{\psi[x(n)]}{1 - \left(1 - \frac{\psi[y(n)] + \psi[y(n+1)]}{4\psi[x(n)]}\right)^2}} \approx |a(n)| \quad (29)$$

It is very simple to implement DESA since it only requires a few simple operations per output sample and involves a very short window of samples around the time instant at which the amplitude and frequency are estimated.

E.6 Speakers-Cluster via Pitch-Period Estimation

The amplitude envelope a(n) obtained by DESA is a quasi-periodic signal. Actually, its period is the pitch period. By estimating the period of a(n), the pitch period is obtained. The formant frequency mainly depends on the vocal tract shape and the positions of the articulators (i.e., tongue, lips, jaw, etc.). It is typically different in various pronunciations even for the same speaker. Thus, the formant frequency is a content-dependent feature and not a stable feature for speaker recognition. Pitch represents the perceived fundamental frequency of a sound. It is typically the same for different vowel-like sounds uttered by the same speaker. Thus, it is used as a good feature for speaker recognition. Power spectrum analysis is used to estimate the pitch. The quasi-periodicity of the amplitude envelope in the time domain would yield peaks in the corresponding power spectrum. Thus, the problem of pitch period detection can be converted into the peak detection in the power spectrum. In the power spectrum of the amplitude envelope, the largest non-DC peak is identified and the reciprocal of its frequency location is used as the estimation of the pitch period. Although the pitch does not allow a good discrimination between speakers, it is used as a first subdivision of speakers into several distinct clusters. For example, given a set of N speakers, several clusters may be obtained based on their pitch frequencies. Each cluster contains a certain number of speakers which have relatively close pitch frequencies with each other. For example, statistical analysis of temporal variation in pitch frequency during conversational speech for every speaker indicates the mean and standard deviation for female voices are roughly twice those for male voices. The mean and standard deviation for male voices are 125 and 20.5 Hz, respectively, whereas those for female voices are two times larger. Thus a coarse and simple classification based on pitch frequency is able to divide all speakers into two distinct clusters: female and male. In fact, it is contemplated that the pitch parameter is expected to provide finer division for speakers into more distinct clusters instead of just two.

In one or more embodiments, the aforementioned pre-determined speaker clusters may be hierarchical speaker clusters arranged in speaker cluster hierarchies. FIG. 3B shows an example speaker cluster hierarchies (300) arranged as a tree structure including all speaker hierarchy (310), gender hierarchy (320), age hierarchy (330) and native language hierarchy (340). Further as shown in FIG. 3B, the speaker gender hierarchy (320) includes male speaker node (320a) and female speaker node (320b), age hierarchy (330) includes child speaker nodes (330a, 330c) and adult speaker nodes (330b, 330d), and the native language hierarchy (340) includes native English speaker nodes (340a, 340c) and native Mandarin speaker nodes (340b, 340d). As described above, the leaf nodes (330c, 330d, 340a, 340b, 340c, 340d) correspond to pre-determined speaker clusters, for example, female child speaker cluster, female adult speaker cluster, male child native English speaking cluster, male adult English speaking cluster, male child native Mandarin speaking cluster, and male adult Mandarin speaking cluster, respectively.

Figure 4:
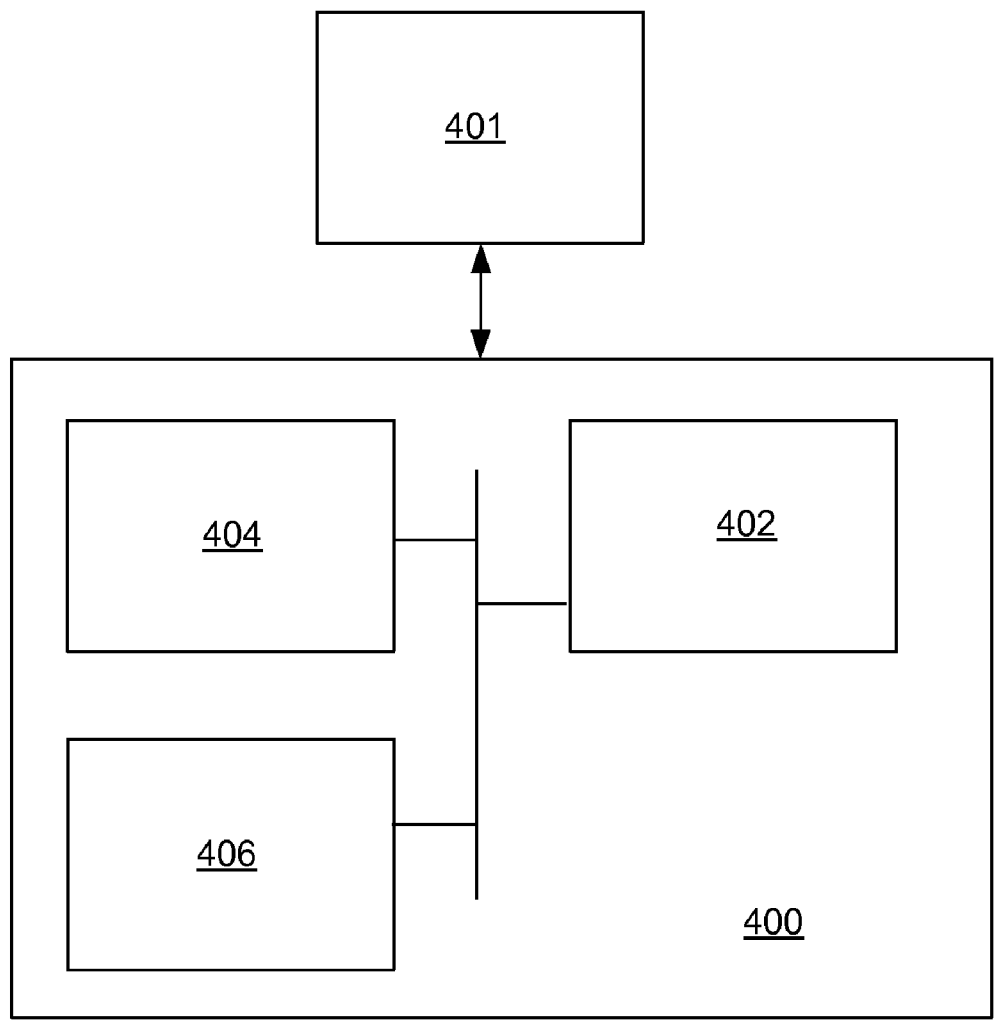
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with, wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for real-time speaker recognition, comprising:
   obtaining speech data of a speaker to identify the speaker from a plurality of speakers;
   extracting, using a processor of a computer, a coarse feature of the speaker from the speech data;

identifying the speaker as belonging to a pre-determined speaker cluster that is one of a plurality of partitions of the plurality of speakers and corresponds to a subset of a plurality of biometric signatures of the plurality of speakers, wherein identifying the speaker as belonging to the pre-determined speaker cluster is based on comparing the coarse feature of the speaker to a speaker independent parameter representing the subset of the plurality of biometric signatures;

further identifying, in response to identifying the speaker as belonging to the pre-determined speaker cluster, the speaker as belonging to a second level pre-determined speaker cluster that is one of a plurality of second level partitions of the pre-determined speaker cluster and corresponds to a second level subset of the subset of the plurality of biometric signatures, wherein identifying the speaker as belonging to the second level pre-determined speaker cluster is based on comparing the coarse feature of the speaker to a second level speaker independent parameter representing the second level subset of the subset of the plurality of biometric signatures;

extracting, using the processor of the computer, a plurality of Mel-Frequency Cepstral Coefficients (MFCC) and a plurality of Gaussian Mixture Model (GMM) components from the speech data;

determining a biometric signature of the speaker based on the plurality of MFCC and the plurality of GMM components; and determining in real time, using the processor of the computer, an identity of the speaker by comparing the biometric signature of the speaker to the second level subset of the subset of the plurality of biometric signatures, wherein each of the plurality of biometric signatures is specific to one of the plurality of speakers.

2. The method of claim 1, wherein each of the plurality of partitions of the plurality of speakers comprises one of a plurality of speaker gender clusters, wherein each of the plurality of second level partitions of the pre-determined speaker cluster comprises one of a plurality of speaker age clusters, the method further comprising:

further identifying, in response to identifying the speaker as belonging to the second level pre-determined speaker cluster, the speaker as belonging to a third level pre-determined speaker cluster that is one of a plurality of third level partitions of the second level pre-determined speaker cluster and corresponds to a third level subset of the second level subset of the subset of the plurality of biometric signatures, wherein identifying the speaker as belonging to the third level pre-determined speaker cluster is based on comparing the coarse feature of the speaker to a third level speaker independent parameter representing the third level subset of the second level subset of the subset of the plurality of biometric signatures, wherein each of the plurality of third level partitions of the second level pre-determined speaker cluster comprises one of a plurality of speaker native language clusters, and wherein comparing the biometric signature of the speaker to the second level subset of the subset of the plurality of biometric signatures is limited to comparing to the third level subset of the second level subset of the subset of the plurality of biometric signatures.

3. The method of claim 2, wherein the speech data is extracted from a phone call conversation of the speaker originated from a pre-determined voice over Internet protocol (VoIP) phone number, the method further comprising:

assigning a biometric signature of a owner of the pre-determined VoIP phone number to the pre-determined VoIP phone number;

determining in real time that the speaker is not the owner of the pre-determined VoIP phone number when the biometric signature of the speaker mis-matches the biometric signature assigned to the pre-determined VoIP phone number.

4. The method of claim 3, wherein the biometric signature assigned to the pre-determined VoIP phone number is generated based on another speech data of the owner obtained during a training period, wherein one of language and content of the speech data and the another speech data are different.

5. The method of claim 1, further comprising:

generating pre-processed speech data by removing silence frames and oversaturation frames from the speech data as well as normalizing loudness of the speech data, wherein the plurality of MFCC and the plurality of GMM components are extracted from the pre-processed speech data.

6. The method of claim 5, wherein the speech data is less than 3 seconds in duration.

7. The method of claim 1, further comprising:

representing the speech data as a sum of a plurality of amplitude modulation and frequency modulation (AM-FM) models corresponding to a plurality of formants;

extracting, using a processor of a computer, a plurality of vowel-like speech frames from the speech data;

determining, using the processor of the computer, one or more dominant formant frequencies based on the plurality of vowel-like speech frames and the plurality of AM-FM models;

generating one or more set of filtered speech data by band-passed filtering the plurality of vowel-like speech frames based on the one or more dominant formant frequencies;

generating one or more quasi-periodic amplitude envelops from the one or more set of filtered speech data using discrete energy separation algorithm (DESA); and determining a pitch period of the speaker from the one or more quasi-periodic amplitude envelops, wherein the coarse feature of the speaker comprises the pitch period of the speaker.

8. The method of claim 7, wherein the pre-determined speaker cluster corresponds to one of male speaker cluster and female speaker cluster.

9. A non-transitory computer readable medium, embodying instructions when executed by the computer to perform real-time speaker recognition, the instructions comprising functionality for:

obtaining speech data of a speaker to identify the speaker from a plurality of speakers;

extracting a coarse feature of the speaker from the speech data;

identifying the speaker as belonging to a pre-determined speaker cluster that is one of a plurality of partitions of the plurality of speakers and corresponds to a subset of a plurality of biometric signatures of the plurality of speakers, wherein identifying the speaker as belonging to the pre-determined speaker cluster is based on comparing the coarse feature of the speaker to a speaker independent parameter representing the subset of the plurality of biometric signatures;

further identifying, in response to identifying the speaker as belonging to the pre-determined speaker cluster, the speaker as belonging to a second level pre-determined speaker cluster that is one of a plurality of second level partitions of the pre-determined speaker cluster and corresponds to a second level subset of the subset of the plurality of biometric signatures, wherein identifying the speaker as belonging to the second level pre-determined speaker cluster is based on comparing the coarse feature of the speaker to a second level speaker independent parameter representing the second level subset of the subset of the plurality of biometric signatures;

extracting a plurality of Mel-Frequency Cepstral Coefficients (MFCC) and a plurality of Gaussian Mixture Model (GMM) components from the speech data;

determining a biometric signature of the speaker based on the plurality of MFCC and the plurality of GMM components; and determining in real time, using the processor of the computer, an identity of the speaker by comparing the biometric signature of the speaker to the second level subset of the subset of the plurality of biometric signatures, wherein each of the plurality of biometric signatures is specific to one of the plurality of speakers.

10. The non-transitory computer readable medium of claim 9, wherein each of the plurality of partitions of the plurality of speakers comprises one of a plurality of speaker gender clusters hierarchy, wherein each of the plurality of second level partitions of the pre-determined speaker cluster comprises one of a plurality of speaker age clusters, the instructions further comprising functionality for:

further identifying, in response to identifying the speaker as belonging to the second level pre-determined speaker cluster, the speaker as belonging to a third level pre-determined speaker cluster that is one of a plurality of third level partitions of the second level pre-determined speaker cluster and corresponds to a third level subset of the second level subset of the subset of the plurality of biometric signatures, wherein identifying the speaker as belonging to the third level pre-determined speaker cluster is based on comparing the coarse feature of the speaker to a third level speaker independent parameter representing the third level subset of the second level subset of the subset of the plurality of biometric signatures, wherein each of the plurality of third level partitions of the second level pre-determined speaker cluster comprises one of a plurality of speaker native language clusters, and wherein comparing the biometric signature of the speaker to the second level subset of the subset of the plurality of biometric signatures is limited to comparing to the third level subset of the second level subset of the subset of the plurality of biometric signatures.

11. The non-transitory computer readable medium of claim 10, wherein the plurality of hierarchical speaker clusters comprises more than 500 clusters and the one of the plurality of biometric signature libraries comprises over 1000 biometric signatures.

12. The non-transitory computer readable medium of claim 9, the instructions when executed by the processor further comprising functionality for:

generating pre-processed speech data by removing silence frames and oversaturation frames from the speech data as well as normalizing loudness of the speech data, wherein the plurality of MFCC and the plurality of GMM components are extracted from the pre-processed speech data.

13. The non-transitory computer readable medium of claim 12, wherein the speech data is less than 3 seconds in duration.

14. The non-transitory computer readable medium of claim 9, the instructions when executed by the processor further comprising functionality for:

representing the speech data as a sum of a plurality of amplitude modulation and frequency modulation (AM-FM) models corresponding to a plurality of formants;

extracting a plurality of vowel-like speech frames from the speech data;

determining one or more dominant formant frequencies based on the plurality of vowel-like speech frames and the plurality of AM-FM models;

generating one or more set of filtered speech data by band-passed filtering the plurality of vowel-like speech frames based on the one or more dominant formant frequencies;

generating one or more quasi-periodic amplitude envelops from the one or more set of filtered speech data using discrete energy separation algorithm (DESA); and determining a pitch period of the speaker from the one or more quasi-periodic amplitude envelops, wherein the coarse feature of the speaker comprises the pitch period of the speaker.

15. The non-transitory computer readable medium of claim 14, wherein the pre-determined speaker cluster corresponds to one of male speaker cluster and female speaker cluster.

16. A system for speaker recognition, comprising:
a repository storing a plurality of biometric signature libraries;
a processor; and
memory storing instructions when executed by the processor comprising functionalities for: obtaining speech data of a speaker to identify the speaker from a plurality of speakers;

extracting a coarse feature of the speaker from the speech data;

identifying the speaker as belonging to a pre-determined speaker cluster that is one of a plurality of partitions of the plurality of speakers and corresponds to a subset of a plurality of biometric signatures of the plurality of speakers, wherein identifying the speaker as belonging to the pre-determined speaker cluster is based on comparing the coarse feature of the speaker to a speaker independent parameter representing the subset of the plurality of biometric signatures;

further identifying, in response to identifying the speaker as belonging to the pre-determined speaker cluster, the speaker as belonging to a second level pre-determined speaker cluster that is one of a plurality of second level partitions of the pre-determined speaker cluster and corresponds to a second level subset of the subset of the plurality of biometric signatures, wherein identifying the speaker as belonging to the second level pre-determined speaker cluster is based on comparing the coarse feature of the speaker to a second level speaker independent parameter representing the second level subset of the subset of the plurality of biometric signatures;

extracting a plurality of Mel-Frequency Cepstral Coefficients (MFCC) for a Gaussian Mixture Model (GMM) from the speech data;

determining a biometric signature of the speaker based on the plurality of MFCC and the GMM; and determining in real time, using the processor of the computer, an identity of the speaker by comparing the biometric signature of the speaker to the second level subset of the subset of the plurality of biometric signatures, wherein each of the plurality of biometric signatures is specific to one of the plurality of speakers.

17. The system of claim 16, wherein each of the plurality of partitions of the plurality of speakers comprises one of a plurality of speaker gender clusters, wherein each of the plurality of second level partitions of the pre-determined speaker cluster comprises one of a plurality of speaker age clusters, the instructions when executed by the processor further comprising functionalities for:

further identifying, in response to identifying the speaker as belonging to the second level pre-determined speaker cluster, the speaker as belonging to a third level pre-determined speaker cluster that is one of a plurality of third level partitions of the second level pre-determined speaker cluster and corresponds to a third level subset of the second level subset of the subset of the plurality of biometric signatures, wherein identifying the speaker as belonging to the third level pre-determined speaker cluster is based on comparing the coarse feature of the speaker to a third level speaker independent parameter representing the third level subset of the second level subset of the subset of the plurality of biometric signatures, wherein each of the plurality of third level partitions of the second level pre-determined speaker cluster comprises one of a plurality of speaker native language clusters, and wherein comparing the biometric signature of the speaker to the second level subset of the subset of the plurality of biometric signatures is limited to comparing to the third level subset of the second level subset of the subset of the plurality of biometric signatures.

18. The system of claim 17, wherein the plurality of hierarchical speaker clusters comprises more than 500 clusters and the one of the plurality of biometric signature libraries comprises over 1000 biometric signatures.

19. The system of claim 16, the instructions when executed by the processor further comprising functionality for:

generating pre-processed speech data by removing silence frames and oversaturation frames from the speech data as well as normalizing loudness of the speech data, wherein the plurality of MFCC for the GMM are extracted from the pre-processed speech data.

20. The system of claim 19, wherein the speech data is less than 3 seconds in duration.

21. The system of claim 16, the instructions when executed by the processor further comprising functionality for:

representing the speech data as a sum of a plurality of amplitude modulation and frequency modulation (AM-FM) models corresponding to a plurality of formants;

extracting a plurality of vowel-like speech frames from the speech data;

determining one or more dominant formant frequencies based on the plurality of vowel-like speech frames and the plurality of AM-FM models;

generating one or more set of filtered speech data by band-passed filtering the plurality of vowel-like speech frames based on the one or more dominant formant frequencies;

generating one or more quasi-periodic amplitude envelops from the one or more set of filtered speech data using discrete energy separation algorithm (DESA); and determining a pitch period of the speaker from the one or more quasi-periodic amplitude envelops, wherein the coarse feature of the speaker comprises the pitch period of the speaker.

22. The system of claim 21, wherein the pre-determined speaker cluster corresponds to one of male speaker cluster and female speaker cluster.

\* \* \* \* \*